May 27, 1958 R. A. TROSS 2,836,028
GRASS TRIMMER
Filed April 13, 1956
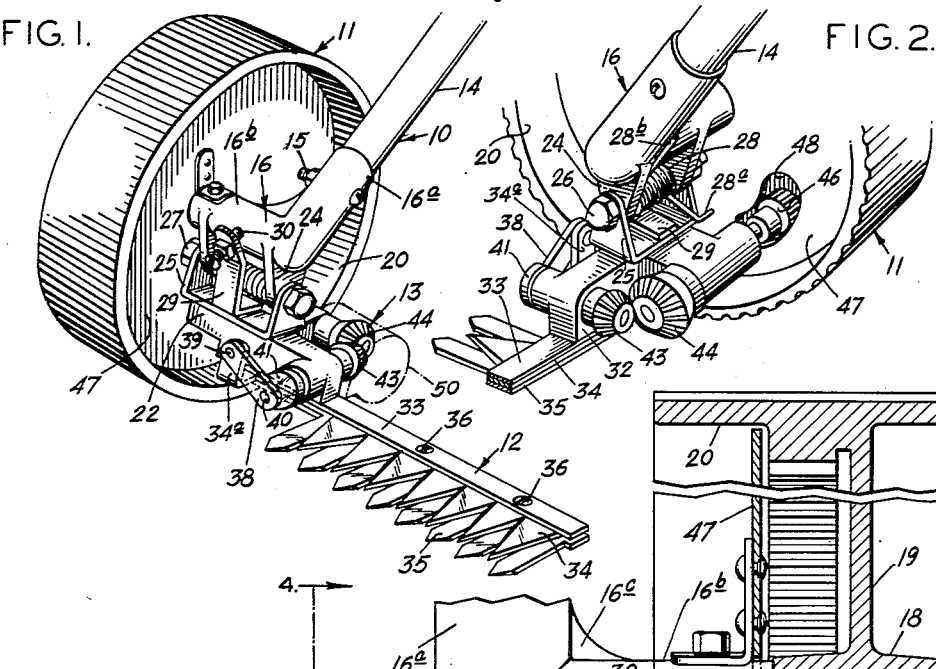
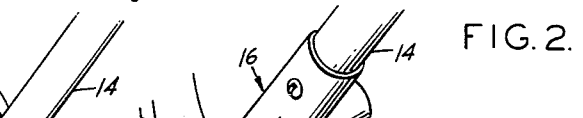
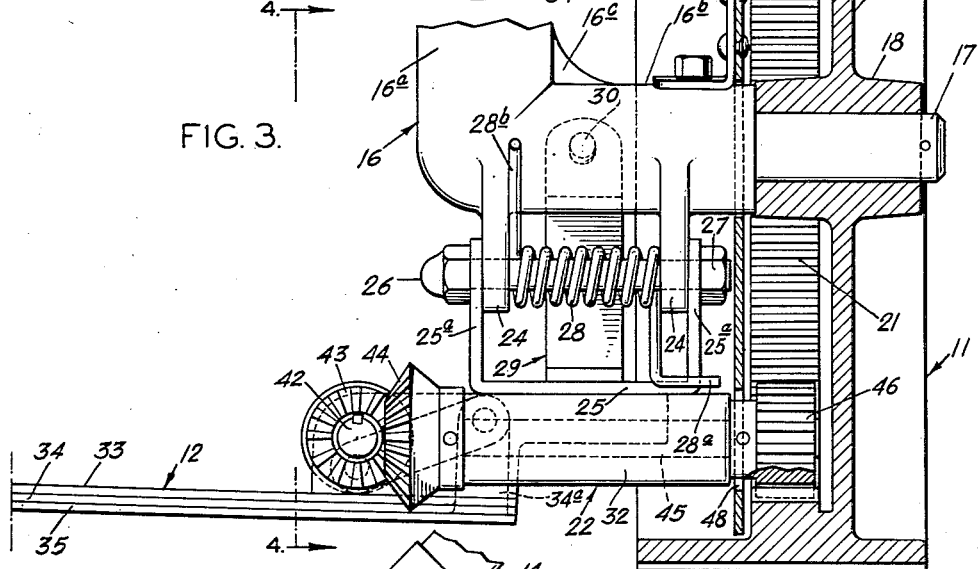
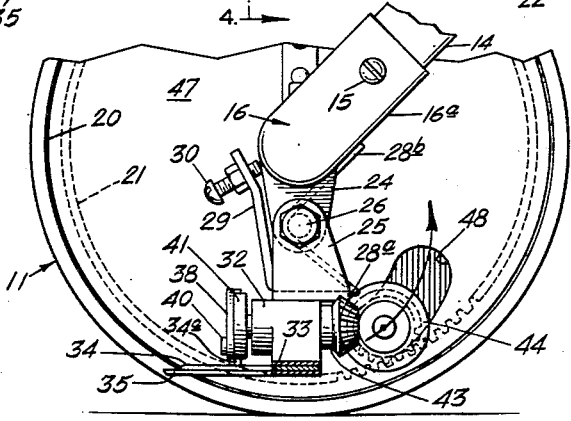
INVENTOR:
ROBERT A. TROSS
BY Howson & Howson
ATTYS.

United States Patent Office 2,836,028
Patented May 27, 1958

2,836,028

GRASS TRIMMER

Robert A. Tross, Broomall, Pa.

Application April 13, 1956, Serial No. 578,023

4 Claims. (Cl. 56—264)

This invention relates to a novel grass trimmer and particularly to a grass trimmer which is wheel actuated by a single wheel and which is preferably pushed by hand.

Conventional lawn mowers have limited use as grass trimmers because their two wheel construction prevents ready adjustment of the height of the cutter above the ground in accordance with the requirements of trimming adjacent to walks and at other edges of the lawn. A few devices for grass trimming while the operator is standing are commercially available, but none of them is completely satisfactory from the standpoint of maneuverability and accuracy in cutting.

The present invention relates to a grass trimmer which is operated in much the same way as a conventional law mower so that the operator need not bend over when using it and may accomplish the trimming by simply pushing it. The trimmer is relatively light in weight compared with lawn mowers and its weight is supported on a single wheel rather than being carried in any way by the operator. The cutting structure protrudes from one side of the wheel, preferably the same side as the supporting frame, and is operated by suitable gear coupling to the wheel so that it moves as the wheel rolls.

In its preferred form, the present invention is a grass trimmer having a frame member with a handle at one end and an axle at the other. The axle is preferably part of one leg of an L-shaped casting, the other leg being extended to the handle. A single wheel is mounted on the axle, said wheel being adapted to roll on the ground and being provided with an internal gear. A cutter is supported on the frame and a gear coupling is rotatably supported on the same portion of the frame. The cutter support portion of the frame is preferably rotatable relative to the rest of the frame about an axis which is parallel to the axle and lies between the axle and the internal gear of the wheel. The cutter may be of the so-called sickle-bar type, that is, one having parallel mutually contacting blades which have a relative sliding motion confined to a linear movement in the plane of the moving blade.

In its preferred form, the grass trimmer avoids damage to the cutter by automatically disengaging the gear coupling from the internal gear of the wheel. Since the cutter support portion of the frame rotates relative to the rest of the frame about the aforementioned pivot point, in its preferred construction the cutter support is preferably held in such position that a pinion of the gear coupling is normally engaged with the internal gear of the wheel. A simple way of accomplishing this end is to provide a stop which opposes rotation of the cutter support in one direction and a spring which urges the cutter support into this stopped position in which the gear coupling meshes with the internal gear so that upon striking an object the cutter support will rotate from the meshed position in opposition to the spring and consequently the gear coupling will be disengaged from the internal gear on the wheel.

For a better understanding of the present invention, reference is made to the following drawing, wherein Fig. 1 illustrates in perspective a preferred form of the present invention;

Fig. 2 illustrates the same structure in perspective form a different view;

Fig. 3 is a somewhat enlarged rear elevational view partially in section; and

Fig. 4 is a side elevational view of part of the trimmer structure taken along line 4—4 of Fig. 3.

Referring to the drawing, it will be seen that the present invention consists of a frame structure 10, a wheel 11, a cutter 12 and a gear coupling 13. In general, the frame provides the overall support of the structure and provides a connecting member on which a handle is placed. It also provides the axle on which the wheel 11 is mounted to rotate and provides support for the cutter 12. The same part of the frame which provides support for cutter 12, supports gear coupling 13.

It will be seen from Figs. 1 and 2, that the frame consists of a shaft 14 fixed by a nut and bolt 15 to a casting 16. The shaft 14 is preferably hollow tubing which extends backward to a handle which forms a T and is parallel to the ground and parallel to the axle 17 which will be described. The casting 16 is preferably provided with tubular end of leg 16a into which end the shaft 14 is inserted and preferably snugly accepted so that a single nut and bolt 15 are all that are required to hold it in place. The remainder of the casting 16 may be solid and leg 16b is preferably solid and terminated in an axle 17 which is machined to as great a degree of precision as may be required in a particular case. For a greater structural strength a web 16c may be provided between legs 16a and 16b of the casting 16.

The wheel 11 has a hub 18, a web 19 and a rim 20. The hub 18 is machined to form a journaled bearing for axle 17 and is slid over the axle as shown in Fig. 3. A cotter pin, or other appropriate holding device, is used to hold the wheel in place. The web in some applications may be in the form of spokes, but it is preferably in the form of a solid web to act as a cover or shield against the collection of grass in the gearing. The outer surface of the rim 20 is preferably knurled or ridged, as shown, in order to provide a gripping surface for better engagement with the ground. Within the rim 20, and preferably cast integral therewith, is an internal gear 21 which serves as the primary drive for the cutter 12 as will be explained hereafter.

The support 10 is preferably a two piece construction of which the L-shaped member 16 provides one piece, and a part generally designated 22, and referred to hereafter as the cutter support, provides the other. The cutter support 22 is supported on L-shaped member 16, preferably by a pair of parallel flanges 24 which are cast integral with the member 16. The flanges 24 are arranged to extend generally downward when the cutter is in the cutting position shown in the drawing. The cutter support itself includes a U-shaped or channel-shaped member 25 which, as seen in Fig. 3, has parallel flanges 25a which preferably embrace flanges 24 so that a bolt 26 may be inserted through aligned holes in flanges 25a and 24 and held in place by a nut 27. This rotatable construction preferably includes a spring member 28 which is preferably helical in form as shown. This member has an end 28a which bears against member 25 and an end 28b which bears against casting 16. Accordingly, as shown in the drawings the spring 28 urges the cutter support in such direction that the stop 29, and more specifically the screw member 30 of the stop 29, is urged into contact with the casting 16. Since the stop 29 is mounted on bracket 25, it serves to limit the relative rotational movement in one direction between the casting 16 and the cutter support 22. The movement in the other direction is opposed to spring 28 which is preferably made of sufficient strength to hold the cutter support in position such that the stop engages member 16 during a normal grass trimming operation. This position, which can be slightly adjusted by screw 30, is a position, as will hereafter be described, in which the gear coupling meshes with the internal gear.

Bracket 25 supports casting 32 to which it may be welded or otherwise fixed. Casting 32, in turn, supports at its bottom a bar 33 and cutter blades 34 and 35, which extend laterally in a direction generally parallel to the axle 17. Cutter bars 34 and 35 are rake shaped and provided with teeth which extend in the normal direction of movement and which may vary in shape in accordance with known cutter principles. Bar 33 and blades 34 and 35 are held together by screws or bolts 36 which preferably permit sliding of blade 34 relative to bar 33 and blade 35 in the general lateral direction of their extension such that the cutting edges of the teeth of blades 34 and 35 are caused to move back and forth across one another in an oscillatory motion, the relative movement of any point on the movable cutter bar relative to the other cutter bar being in a straight line. In order to provide movement, the cutter blade 34 is provided with a drive tab 34a which is connected to a drive rod 38 by a pin 39 at one end of rod 38. At the other end of rod 38, a pin 40 connects the rod to an off-axis position of an eccentric 41, which has a planar face which is generally perpendicular to the axis of rotation and is preferably in the same plane as one surface of the driver tab 34. The eccentric 41 is mounted on the end of a shaft 42 which at its other end supports bevel gear 43. Shaft 42 passes through the casting 32 in which it is journaled. Bevel gear 43 in turn meshes with bevel gear 44 on one end of shaft 45 which passes through casting 32 generally perpendicular to the direction in which shaft 42 passes through said casting. At the other end of shaft 45 is a pinion gear 46 which meshes with the internal gear 21 of wheel 11.

A baffle 47 is preferably provided on casting 16 within rim 20 to parallel web 19 of the wheel so that the internal gear 21 is effectively enclosed between the baffle 47 and the web 19 and hence protected from grass and extraneous material. A relatively small slot 48 is provided and is arcuate in order to provide for revolution of the cutter support 22 around bolt 26. In addition, it is desirable to provide a flexible cover of leather, plastic or some other material surrounding the slot 48 and fixed to the casting 32 so that grass will not enter the hole and interfere with the gearing. Similarly, a metal cover 50, as shown in dotted lines in Fig. 1 is preferably provided to enclose the gears 43 and 44 to prevent their fouling. It will be observed that the gears are fixed in place by set screws through their hubs, by keying or by any other suitable means or combination of suitable means.

The operation of the device of the present invention is relatively simple. The operator pushes the mower by use of the T-shaped handle which is similar to one on a conventional lawn mower. In preferred forms of the device, the tubular member 14 may be curved in such a way that the junction of the T-handle, while parallel to the ground and generally parallel to the axis of the axle 17, is generally behind or in a plane through the wheel 11. In pushing the T-handle a force is imparted through the support structure 10 to the wheel 11 which will roll, rotating about the axle 17. The rolling produces rotation of internal gear 21 relative to the frame and hence drives pinion 46 which, through shaft, 45, drives bevel gear 44. Meshing bevel gear 43 is, in turn, driven and through shaft 42 drives eccentric 41. Eccentric 41 through drive rod 38 produces an oscillating motion of tab 34a which is, in consequence, imparted to blade 34. Thus rotation of the wheel produces the familiar oscillatory motion between the blades 34 and 35 which produce cutting of grass or weeds in the familiar sickle-bar cutter fashion.

As the cutter is pushed along over the grass, its level may be conveniently adjusted by raising the level of the handle above the ground or, alternatively, by tilting the cutter upward or downward by twisting the handle out of horizontal. The sickle-bar cutter in combination with the structure of the invention permits the cutter to be moved close to buildings and permits the user to cut under fences and other obstacles under which a conventional lawn mower would not be able to be used. The cutter is easily maneuvered and operated from a standing position. The wheel is preferably of such size that it will move easily over normal ground surfaces and is of sufficient size and weight to provide the needed mechanical advantage to drive the cutter.

In the event that the sickle-bar or other cutter strikes a rock or other object which is unyielding and which might cause breakage of the blades in the event of continued oscillation, the cutter support and the cutter itself and the supported gear coupling is so mounted that it will be driven backward, that is, rotation will occur around bolt 26 as a center, and the primary effect will be to rotate shaft 45 in such a direction that pinion gear 46 will become disengaged from the driving internal gear 21. The slot 48 is of such shape that it will permit the necessary movement to disengage the pinion. It will be observed that, since the radius of rotation of shaft 45 is smaller than the radius of rotation of the wheel, the pinion will rotate away from and out of engagement with the internal gear. The spring 28 is so selected that, upon removal of the obstacle, it will urge the pinion back into operating position.

The invention as described herein is a preferred form of the invention. Modifications will occur to those skilled in the art, and all such modifications within the scope of the claims are intended to be within the scope and spirit of the present invention.

I claim:

1. A grass trimmer comprising an L-shaped frame member, one leg of the L serving as an axle, a single wheel on the axle, said wheel being adapted to roll on the ground and being provided with a concentric internal gear near its periphery, a cutter support supported on the frame to rotate about an axis parallel to the axle and between the axle and the internal gear, a pair of generally horizontally disposed cutter blades one of which is fixed to the cutter support and the other of which is held relative to said support to slide relative thereto, a gear coupling rotatably supported on the cutter support such that in one position of the support a pinion of the coupling meshes with the internal gear of the wheel and coupled to drive the movable cutter blade in reciprocating fashion in response to the rolling of the wheel, stop means limiting removal of the cutter support from the position in which the pinion meshes with the internal gear in one direction and spring means urging the cutter support into the position in which the pinion meshes with the internal gear.

2. The grass trimmer of claim 1 in which the gear coupling consists of a first shaft supported in the cutter support, one end of which is the pinion which meshes with the internal gear and the other end of which supports a bevel gear, a second shaft supported in the cutter supports at right angles to the first and to the direction of movement of the movable cutter blade, on one end of which is a bevel gear which meshes with the bevel gear on the first shaft and on the other end of which is an eccentric which at a point offset from the axis of rotation pivotally supports a drive rod pivotally connected at its other end to the movable cutter blade.

3. A grass trimmer comprising a frame member having two parts, one rotatable relative to the other, one part providing an axle at one end and a handle at the other and the other part serving as a support means, a single wheel on the axle, said wheel being adapted to roll on the ground and being provided with an internal gear, a cutter supported on the support portion of the frame, gear coupling connected to the cutter and rotatably supported on the support portion of the frame and adapted in one position of the support portion to engage the internal gear on the wheel for producing movement of the cutter in response to the rolling of the wheel, the axis of rotation of the two parts of the frame being parallel to the axle and along the axis extending through the wheel in a location between the axle and internal gear, a stop limiting rotation of the parts of the frame in one direction, such that when the stop is effective the internal gear is in mesh with the gear coupling and means urging the parts into the stop-limited position but yielding to forces exceeding a predetermined size to permit relative rotation of the frame parts and consequent disengagement of the internal gear and gear coupling.

4. The grass trimmer of claim 3 in which one support member is generally L-shaped, one leg of the L providing the axle for the wheel and in which the cutter consists of generally horizontally disposed cutter blades one of which is fixed to the movable portion of the frame and the other one of which is movable relative to the movable portion of the frame, connection means is provided between the cutter blades permitting only relative sliding in one direction and a translational element connects the movable cutter blade to the gear coupling.

References Cited in the file of this patent

UNITED STATES PATENTS

| | | |
|---|---|---|
| 1,228,045 | Pietrobono | May 29, 1917 |
| 2,673,441 | Sargent | Mar. 30, 1954 |